United States Patent

Marshall et al.

[15] 3,665,073

[45] May 23, 1972

[54] PHARMACEUTICALS PREPARED FROM POLYCYCLIC BASES AND CATION EXCHANGE RESINS

[72] Inventors: Alan Marshall, Bollington; Anne Wilson Macpherson, Macclesfield, both of England

[73] Assignee: Geigy Chemical Corporation, Ardsley

[22] Filed: Aug. 8, 1968

[21] Appl. No.: 751,047

[30] Foreign Application Priority Data

Aug. 12, 1967 Great Britain ................ 37,136/67

[52] U.S. Cl. ................................ 424/79, 424/81, 424/244
[51] Int. Cl. ................................................. A61k 27/00
[58] Field of Search ......................... 424/79, 81, 244

[56] References Cited

UNITED STATES PATENTS

| | | | |
|---|---|---|---|
| 2,990,332 | 6/1961 | Keating | 424/79 |
| 3,226,294 | 12/1965 | Nelson | 424/244 |
| 3,140,978 | 7/1964 | Zentner | 424/260 |
| 3,143,465 | 8/1964 | Keating | 424/79 |
| 3,313,686 | 4/1967 | Bryan | 424/79 |
| 3,337,402 | 8/1967 | Zentner | 424/165 |
| 3,344,030 | 9/1967 | Stevens | 424/244 |

FOREIGN PATENTS OR APPLICATIONS 1,101,366   1/1968   Great Britain

OTHER PUBLICATIONS

Amberlite Ion Exchange Resins, Charts from Amer–Hi–Lites No. 90, Nov. 1965
Merck Index, Merck & Co. Rahway N.J. 8th Ed. 1968 pp. 235, 236, 341, 343, 562, 772
Barr, Amer. Perf. & Cos. Vol. 78, Feb. 1963 pp. 37– 41, 44, 45

*Primary Examiner*—Albert T. Meyers
*Assistant Examiner*—A. P. Fagelson
*Attorney*—Karl F. Jorda and Bruce M. Collins

[57] ABSTRACT

Pharmaceutical compositions suitable for oral administration are prepared from non-ionisable polycyclic bases, an ion-exchange resin containing carboxylic acid groups and a pharmaceutically acceptable carrier liquid. These compositions are used for producing an anti-depressant effect in mammals. A typical embodiment is a composition containing imipramine and Zeo-Karb 226.

3 Claims, No Drawings

PHARMACEUTICALS PREPARED FROM POLYCYCLIC BASES AND CATION EXCHANGE RESINS

DETAILED DISCLOSURE

The present invention relates to medicinal products and more particularly to pharmaceutical compositions in liquid form providing immediate and rapid release of the therapeutic agent.

Liquid pharmaceutical preparations containing combinations of ionizable therapeutic agents with ion-exchange resins are known which provide sustained medication by giving slow and even release of the therapeutic agent over a relatively long period of time, as a result of being acted upon by the normal contents of the gastro-intestinal tract. We have found that liquid pharmaceutical preparations containing 5-(3-dimethylaminopropyl)-10,11-dihydro-5H-dibenz[b,f]azepine, hereinafter referred to as "imipramine base" and certain chemically similar non-ionizable polycyclic bases as hereinafter defined in combination with ion-exchange resins in the form of methacrylate polymers containing carboxyl groups and having a degree of cross-linkage between 1 percent and 10 percent will provide immediate and rapid release of the therapeutic agent as in vitro- (simulated gastric juice) and in vivo (study of blood levels) experiments indicate.

The non-ionizable polycyclic bases which behave in a similar manner to imipramine base are chlorimipramine base, ketoimipramine base, 5-(3-methylaminopropyl)-10,11-dihydro-5H-dibenz[b,f]azepine hereinafter referred to as "desimipramine base" and 4-[3-(5H-dibenzo[b,f]azepin-5-yl)-propyl]-1-(2-hydroxyethyl)-piperazine hereinafter referred to as "opipramol base."

According to the present invention there is provided a pharmaceutical preparation suitable for oral administration comprising a suspension or dispersion, in a carrier liquid which is substantially free of ions or ionizable material, of a solid compound formed from a non-ionizable polycyclic base as hereinbefore defined and an ion-exchange resin in the form of a methacrylate polymer containing carboxyl groups and having a degree of cross-linkage between 1 percent and 10 percent.

Although any of the aforementioned non-ionizable polycyclic bases may be used, imipramine base is particularly preferred.

The base used in the preparation of the solid compound formed from the base and an ion-exchange resin is in the form of a pharmaceutical grade free base. The base may, if desired, be set free from the corresponding salt by a conventional method such as solvent extraction after making alkaline or by passing through an anion-exchange column. The base is subsequently converted to the solid resin-drug compound by reacting with a cation-exchange resin.

The salts, from which the bases used in the present invention may be prepared, may be, for example, the hydrochlorides which are the active substances of pharmaceutical preparations, i.e., imipramine hydrochloride, chlorimipramine hydrochloride, keto-imipramine hydrochloride, desimipramine hydrochloride and opipramol dihydrochloride.

The anion-exchange resin used in the conversion of the salt to the base may be selected from a wide range of anion-exchange resins. Strong anion-exchange resins are particularly advantageous and there may be used, for instance, "Deacidite FF (IP)" in the hydroxide form, "Amberlite IRA 400" or "Dowex 1" which are polystyrene type polymers containing quaternary ammonium groups and cross-linked with divinyl benzene. (Deacidite, Amberlite and Dowex are Registered Trade Marks).

The cation-exchange resin used in the preparation of the resin-drug compound preferably has a degree of cross-linkage between 2 percent and 6 percent. The particle size of the resin is preferably in the range of 1 to 150 microns, especially 5 to 80 microns. A wide range of cation-exchange resins may be used, for instance "Zeo-Karb 226" which is a polymethacrylic acid or "Amberlite IRC-50" which is a copolymer of methacrylic acid and divinyl benzene. (Zeo-Karb is a Registered Trade Mark).

The proportion of base to the resin may vary from 10 to 50 percent but is preferably from 20 to 30 percent on a dry weight to weight basis.

The base resin/drug compound is preferably in fine suspension in a liquid medium in which water is the major component. The proportion of base present in the liquid medium is preferably in the range of from 0.001 to 0.025 parts by weight per unit part by volume.

The liquid medium may contain adjuvants conventionally used such as non-ionizing sweeteners, flavors, colloid thickening agents, colors and preservatives.

The pharmaceutical preparations of the present invention give immediate and rapid release of the drug over a relatively short period of time.

The pharmaceutical compositions prepared according to the invention are effective in both endogenous and exogenous depressions including such depression as involutional melancholia, reactive depression, depression associated with senility and organic lesions such as arteriosclerosis, depression associated with psychiatric disorders such as schizophrenia, alcoholism and mental deficiency and the like.

For their intended use the pharmaceutical compositions of the invention are administered orally in amounts depending on the patient and the specific condition to be treated. In general the dosage of the composition is adjusted in a way that 25 – 75 mg of the base present in the base-resin compound is daily administered. The dosage may be increased so that up to 200 mg of the base is daily administered. The toxicity of the base-resin compounds is comparable to the known toxicity of the hydrochlorides of the bases.

The therapeutic agents as normally administered in the form of their hydrochloride salts are anesthetic to the mouth but the liquid preparation of the present invention results in the obscuration of this anesthesia. The liquid preparation also obscures the bitter taste of these compounds. Further, the resin-drug compound is formed in a better yield by a quicker and easier method when using the free bases of the present invention.

The following examples further illustrate the present invention.

EXAMPLE 1

An anion-exchange column was prepared by suspending 50.0 grams of "Deacidite FF(IP)" anion-exchange resin, in the chloride form in 500 milliliters of distilled water and filling into a Pyrex column, effective length 30 centimeters and 18 millimeters bore. The column was washed with two bed-volumes of 3 percent hydroxide solution equal to 136 milliliters to convert the resin to the hydroxide form. The column was then washed with 2 liters of carbon dioxide-free distilled water to remove excess alkali followed by a final wash with 70 percent volume/volume ethanol in distilled water.

5.0 grams of imipramine hydrochloride were dissolved in 100 milliliters of 70 percent volume/volume ethanol in distilled water. This solution was allowed to flow slowly down the column, the flow being adjusted so that it emerged at the rate of two drops per second. It was then washed with 70 percent volume/volume ethanol in distilled water and 500 milliliters of solution and washings were collected. This volume contained all the imipramine as base. To this solution was added sufficient "Zeo-Karb 226" cation-exchange resin 200 mesh to produce a 25 percent resin/drug compound. The resin was stirred in the solution for 1 hour to allow reaction between the solution of base and the carboxylic resin.

At the end of this time the resin/drug compound was filtered off, washed with distilled water until all solvent was removed. The compound may, if desired, be dried at a temperature not exceeding 40° C.

EXAMPLE 2

400 grams of imipramine hydrochloride were dissolved in 4 liters of water and adjusted to pH 8 by the addition of solid sodium bicarbonate. The liberated base was extracted by diethyl ether 600, 400 and 200 milliliters. The combined ether extracts were washed with water in 100 milliliter portions until the washings were free from chloride then dried with anhydrous sodium sulfate, filtered and the solvent removed by evaporation. The residue assayed 99.9% $C_{19}H_{24}N_2$.

250 grams of the free base were dissolved in 3.5 liters of 80 percent volume/volume acetone/water and stirred with the equivalent of 750 grams dry weight "Zeo-Karb 226" in the hydrogen form for 2 hours. The suspension was filtered and the residue washed with acetone and dried.

EXAMPLE 3

An Imipramine Syrup was prepared by the following method:

In a suitable container were placed 50 grams sorbitol syrup, 20 milliliters of water and to this was added 12.5 grams sucrose, 0.1 grams methyl parahydroxybenzoate and the mixture was stirred until dissolved with heating as necessary.

After cooling to 40° C., 0.8 grams powdered Tragacanth was added in small quantities at a time using a high dispersion stirrer, the stirring being continued for 2 hours. To this syrup was added 0.1 milliliters of flavoring compound and the mixture was stirred until homogeneous.

1.77 grams of the imipramine base resin/drug compound (calculated as dry weight) prepared in Example 1 were added followed by sufficient water to produce 100 milliliters and the suspension was stirred until homogeneous.

EXAMPLE 4

250 grams of desimipramine base were dissolved in 3.5 liters of 70 percent isopropanol/water and stirred with the equivalent of 750 grams dry weight "Zeo-Karb 226" in the hydrogen form for 1 hour. The suspension was filtered and the residue was washed with isopropanol and dried. A syrup was prepared from this resin-drug compound by a process essentially similar to that described in Example 3.

EXAMPLE 5

250 grams of chlorimipramine base were dissolved in 3.5 liters of 70 percent isopropanol/water and stirred with the equivalent of 750 grams dry weight of "Zeo-Karb 226" in the hydrogen form for 1 hour. The suspension was filtered and the residue washed with acetone and dried. A syrup was prepared from this resin-drug compound by a process essentially similar to that described in Example 3.

EXAMPLE 6

50 grams of opipramol dihydrochloride were dissolved in 1 liter of water and made alkaline with 300 milliliters of an aqueous solution of sodium bicarbonate containing 20 grams of solid sodium bicarbonate. The base was precipitated and filtered off using a Buchner funnel. The precipitate was then dissolved in 500 milliliters of ethanol and reprecipitated by adding 2 liters of water and filtered off using a Buchner funnel. The precipitate was washed with water and dried overnight at room temperature.

25 grams of opipramol base were dissolved in 0.35 liters of 70% isopropanol/water and stirred with the equivalent of 75 grams dry weight of "Zeo-Karb 226" in the hydrogen form for 1 hour. The suspension was filtered and the residue washed with acetone and dried. A syrup was prepared from this resin-drug compound by a process essentially the same as that described in Example 3.

What we claim is:

1. An oral pharmaceutical composition comprising an aqueous suspension or dispersion of a solid compound formed by mixing
    a. a methacrylic acid polymeric or copolymeric cation exchange resin having a degree of cross linkage of from about 2 percent to about 6 percent and particle size of from about 1 to about 150 microns with
    b. from 10 to 50 percent of said resin, weight per weight, of a free base of a compound selected from the group consisting of imipramine, desimipramine, opipramol, 10-ketoimipramine and chlorimipramine, said composition being substantially free of ionizable material and containing a quantity of said compound sufficient to supply from about 0.1 to about 2.5 percent, weight per volume, of said free base.

2. The composition of claim 1 wherein said polymeric cation exchange resin is polymethacrylic acid having a degree of crosslinkage of about 4.5 percent, and the amount of free base is from about 20 to about 30 percent, weight by weight, of said resin.

3. The method of producing an anti-depressant effect in a mammal comprising administering orally to said mammal a therapeutically effective amount of the pharmaceutical composition of claim 1.

* * * * *